United States Patent
Edwards et al.

(10) Patent No.: US 9,534,955 B2
(45) Date of Patent: Jan. 3, 2017

(54) MULTI-CHANNEL UV DETECTION FOR IMPROVED SOLAR SPECTRUM AND UV INDEX ESTIMATION

(71) Applicant: Maxim Integrated Products, Inc., San Jose, CA (US)

(72) Inventors: Christopher F. Edwards, Sunnyvale, CA (US); Dan G. Allen, Cupertino, CA (US); Cheng-Wei Pei, Belmont, CA (US); Timothy K. McGuire, Beaverton, OR (US); Joy T. Jones, Fremont, CA (US); Nicole D. Kerness, Menlo Park, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/671,063

(22) Filed: Mar. 27, 2015

(65) Prior Publication Data
US 2016/0131525 A1     May 12, 2016

Related U.S. Application Data

(60) Provisional application No. 62/076,028, filed on Nov. 6, 2014.

(51) Int. Cl.
| | |
|---|---|
| *G01T 1/24* | (2006.01) |
| *G01J 3/28* | (2006.01) |
| *G01J 3/36* | (2006.01) |
| *G01J 1/04* | (2006.01) |
| *G01J 1/42* | (2006.01) |

(52) U.S. Cl.
CPC ............ *G01J 3/2803* (2013.01); *G01J 1/0488* (2013.01); *G01J 1/429* (2013.01); *G01J 1/4228* (2013.01); *G01J 3/36* (2013.01); *G01J 2001/4266* (2013.01); *G01J 2003/2806* (2013.01)

(58) Field of Classification Search
CPC ....... H01L 31/02162; G01J 1/429; G01J 3/513
See application file for complete search history.

(56) References Cited

U.S. PATENT DOCUMENTS

| | | | | |
|---|---|---|---|---|
| 4,193,022 A | * | 3/1980 | Bertolasi | G05B 19/293 318/592 |
| 2008/0237763 A1 | * | 10/2008 | Miura | H01L 27/144 257/432 |
| 2009/0184254 A1 | * | 7/2009 | Miura | G01J 1/429 250/372 |

* cited by examiner

*Primary Examiner* — Kiho Kim
(74) *Attorney, Agent, or Firm* — Advent, LLP

(57) ABSTRACT

The present disclosure describes an ultraviolet (UV) sensor configured to detect a target UV spectrum (e.g., UVB spectrum). The UV sensor includes a first photodiode with a first UV spectral response and a second photodiode with a second UV spectral response. A filter layer having a graded spectral response is formed over the second photodiode, and the second UV spectral response is affected by a controlled parameter (e.g., thickness) of the filter layer. The UV sensor further includes a subtraction circuit coupled with the first photodiode and the second photodiode. The subtraction circuit is configured to provide a differential response based on a difference between the first UV spectral response and the second UV spectral response. The controlled parameter of the filter layer can be selected such that the differential response provides a detected spectral response of the target spectrum.

11 Claims, 8 Drawing Sheets

MULTI-CHANNEL UV DETECTION FOR IMPROVED SOLAR SPECTRUM AND UV INDEX ESTIMATION

CROSS-REFERENCE TO RELATED APPLICATIONS

The present application claims the benefit under 35 U.S.C. §119(e) of U.S. Provisional Application Ser. No. 62/076,028, entitled MULTI-CHANNEL UV DETECTION FOR IMPROVED SOLAR SPECTRUM AND UV INDEX ESTIMATION, filed Nov. 6, 2014. U.S. Provisional Application Ser. No. 62/076,028 is hereby incorporated by reference in its entirety.

BACKGROUND

Ultraviolet (UV) light affects the human body in both beneficial (e.g., vitamin D and tanning) and detrimental (e.g., skin wrinkling, skin cancer and sun burn or erythema) ways. UV light is typically more difficult to measure than visible and near infrared light because the spectral content is much weaker than visible light and the short wavelength provides an abundance of challenges for UV sensor systems.

The UV spectrum is made up of three regions: UVA, UVB and UVC. Solar UVC radiation is blocked by the earth's atmosphere. Solar UVB light is partially blocked by the stratospheric ozone layer, and UVA light largely transmits. Both UVA and UVB light experience significant Rayleigh scattering—the phenomenon responsible for making the sky blue. The UVB spectral range (~280-315 nm) includes shorter wavelengths than the UVA spectral range (~315-400 nm) and is mostly responsible for sunburn, carcinoma of the skin and vitamin D generation. UVA includes longer wavelengths that cause tanning, freckles and skin aging effects.

For effective UV index calculation, UV sensors must be capable of estimating the solar spectrum incident at ground level accurately. The solar spectrum varies with environmental variables such as zenith angle, atmospheric ozone concentration, altitude and cloud cover. Existing UV sensors techniques typically use a photodiode optimized for detecting wavelengths in the 280 nm to 400 nm range, manufactured in process technologies such as fully depleted (thin film) silicon on insulator technology, Gallium Nitride or Silicon Carbide technologies. In most cases, additional filtering is applied to further improve the selectivity for UV wavelengths. These filters can be applied directly on the sensor, often using wafer level processing techniques, and/or integrated into the housing of the final product or device.

SUMMARY

The present disclosure describes an ultraviolet (UV) sensor configured to detect a target UV spectrum (e.g., UVB spectrum). The UV sensor includes a first photodiode with a first UV spectral response and a second photodiode with a second UV spectral response. A filter layer having a graded spectral response is formed over the second photodiode, and the second UV spectral response is affected by a controlled parameter (e.g., thickness) of the filter layer. The UV sensor further includes a subtraction circuit coupled with the first photodiode and the second photodiode. The subtraction circuit is configured to provide a differential response based on a difference between the first UV spectral response and the second UV spectral response. The controlled parameter of the filter layer can be selected such that the differential response provides a detected spectral response of the target spectrum.

In some embodiments, the UV sensor circuit is implemented in a multi-channel UV sensor. For example, an output of the first photodiode can provide a first channel associated with the first UV spectral response (e.g., a UVA spectral response), while an output of the subtraction circuit can provide a second channel associated with a second target UV spectral response (e.g., a UVB spectral response). In this regard, the multi-channel UV sensor can provide, for example, a UVA sensor channel and a UVB sensor channel. With the UVA and UVB channels, UV index and/or other biologically relevant spectrums can be approximated from ambient illumination detected by the multi-channel UV sensor. In other embodiments, each channel has a respective set of photodiodes and a respective subtraction circuit to enable target spectrum detection and/or leakage current cancellation. In some embodiments, one or more components are shared to reduce the total number of required components. Additionally, one or more wafer level filters (e.g., UVA and/or UVB filters) can be applied for greater control over the sensor channels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
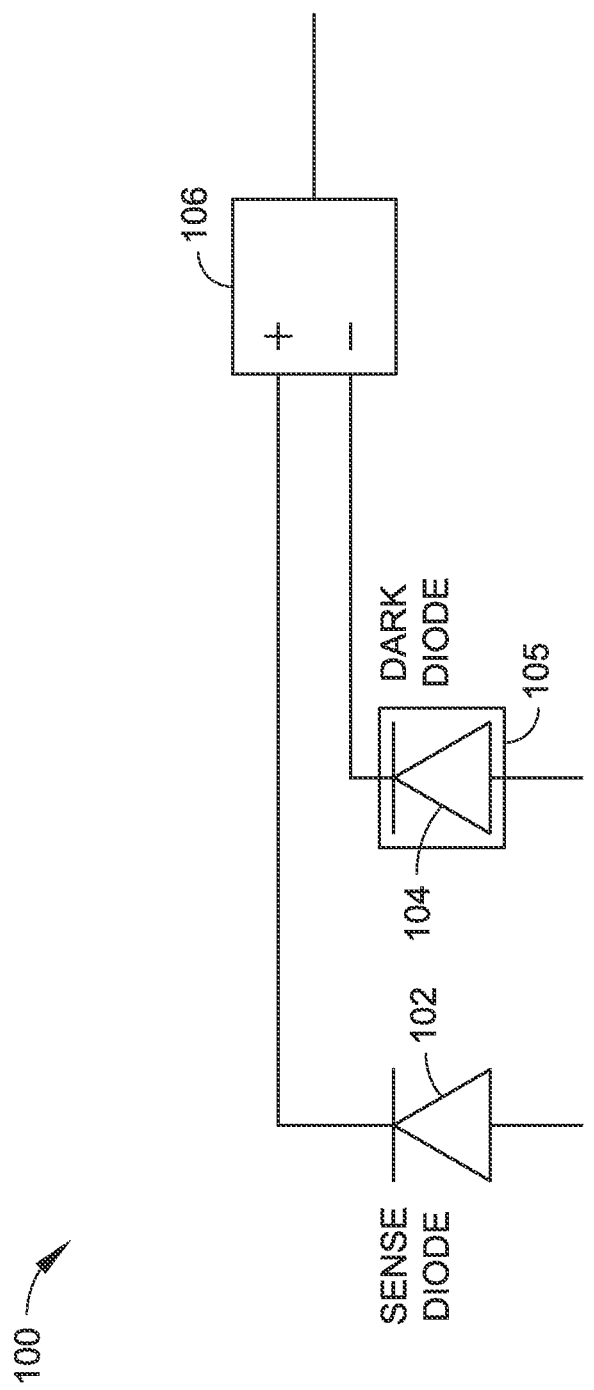
FIG. 1 is a circuit diagram of a UV sensor in accordance with various embodiments of the present disclosure.

It has been found that a single channel UV sensor can be used with positioning (e.g., GPS) data and/or other contextual factors in order to estimate solar spectrum for UV index calculation. A multi-channel UV sensor having two or more sensor channels, each responding to a different part of the UV spectrum, may eliminate the need for positioning data. For example, a multi-channel UV sensor that can measure UVA and UVB spectral responses via respective sensor channels may eliminate the need for estimation based on contextual data. However, measuring the solar spectrum with sufficient accuracy near the UVB spectrum is challenging, partially because filters can be sensitive to manufacturing variations and incident light angle. The use of two or more UV sensors (e.g., photodiodes) requires different filtering profiles for each sensor (or set of sensors making up a channel). For example, two or more wafer level filters can be applied to respective sensor channels. These filters must be manufactured to a high degree of accuracy and repeatability to ensure the overall system response remains consistent across manufacturing process variations and tolerances, consistent with a product that can be reliably manufactured in high volume.

Various configurations are described herein that leverage simple dielectric filters, light-absorbing material layers, and/or existing manufacturing layers within the photodiode manufacturing process, in conjunction with wafer level filtering techniques, to implement two or more spectral profiles with a reduced number of external filters and improved tolerance to manufacturing process variations. For example, an existing passivation layer (e.g., silicon nitride layer) in the photodiode manufacturing process can be used as an absorption filter over at least one of two photodiodes making up a sensor channel. In this regard, the sensor channel can implement a "dark diode subtraction" technique with two or more different spectral profiles, one based on a first photodiode and another based on a second ("dark") photodiode that has a passivation layer formed over it. In some embodiments, the first photodiode can also have a passivation layer formed over it with a different (lesser) thickness than the passivation layer formed over the dark photodiode. A differential spectral response resulting from the dark diode subtraction can be tuned to a target spectrum by controlling a thickness of the passivation layer over the dark photodiode. Accordingly, sensitivity to a target spectrum (e.g., UVB spectrum) can be achieved with a reduced burden on external filters and improved tolerance to manufacturing process variations.

Example Implementations

FIGS. 1 through 4 illustrate various UV sensor circuit configurations, some of which implement multiple sensor channels. Those skilled in the art will appreciate that the embodiments illustrated in the drawings and/or described herein may be fully or partially combined to result in additional embodiments. Accordingly, the illustrated and described embodiments should be understood as explanatory and not as limitations of the present disclosure.

As shown in FIG. 1, a UV sensor 100 can include at least one sensor channel with a first ("sense") photodiode 102 and a second ("dark") diode 104. The sensor channel can include a filter layer 105 formed over the second photodiode 104. The filter layer 105 can have a graded spectral response, where the filter layer 105 has a controlled parameter (e.g., thickness or another spatial or physical attribute) that affects light transmission and/or absorption characteristics of the filter layer, and therefore also affects the spectral response of the second photodiode. In embodiments, the filter layer 105 can include at least one layer having spectrally varying (or graded) material absorption. In this regard, the filter layer 105 can be configured to absorb light at selected spectra by varying a thickness or other spatial attribute or a physical attribute of the filter layer 105. For example, the filter layer 105 can include a passivation layer, such as a silicon nitride layer that is commonly present during typical silicon process manufacturing. By controlling the thickness of the passivation layer, an absorption filter can be effectively implemented. In other embodiments, the filter layer 105 can include a dielectric filter, glass layer, optical interference, or other layer that selectively absorbs or blocks light.

The UV sensor 100 can further include a subtraction circuit/logic 106 configured to output a response based on a differencing function applied to a first spectral response associated with the first photodiode 102 and a second spectral response 104 associated the second photodiode 104. By way of example, this differencing function may be implemented in analog circuitry (e.g., a differential amplifier), in digital circuitry after analog-to-digital conversion of the photodiode currents (e.g., a simple binary subtractor), or in software executable by a processor/controller (after analog-to-digital conversion of the photodiode currents). Each of the photodiodes 102 and 104 provides a different spectral response to UV wavelengths, where the spectral response of at least one photodiode (e.g., the dark photodiode 104) is tuned by controlling at least one parameter (e.g., thickness) of the filter layer formed thereon. For example, the dark photodiode 104 can have a controlled passivation layer (e.g., nitride layer) above it, and the sense photodiode 102 may have a different type of filter layer, a passivation layer with different (e.g., lesser) thickness or no filter layer formed thereon.

When the response of the dark photodiode 104 is subtracted (in electronics or software) from the sense photodiode 102, a modified (differential) spectral response is achieved. The controlled parameter of the filter layer 105 can be selected or adjusted to shift the dark diode response, thereby shifting the differential response towards a target UV spectrum (e.g., UVB (280-320 nm)). In some embodiments, to provide additional filtration/tuning, a wafer level filter 114 (e.g., UVB filter) can be formed over the first photodiode 102 and/or the second photodiode 104 of the sensor channel. This sensor channel architecture can be used to provide improved estimation of solar spectrum and biologically relevant (e.g., UV index) or other selected spectral responses with reduced system complexity (e.g., without needing to input positioning or other contextual data for UVB spectrum estimation), cost, and/or sensitivity to manufacturing process variations.

Figure 2:
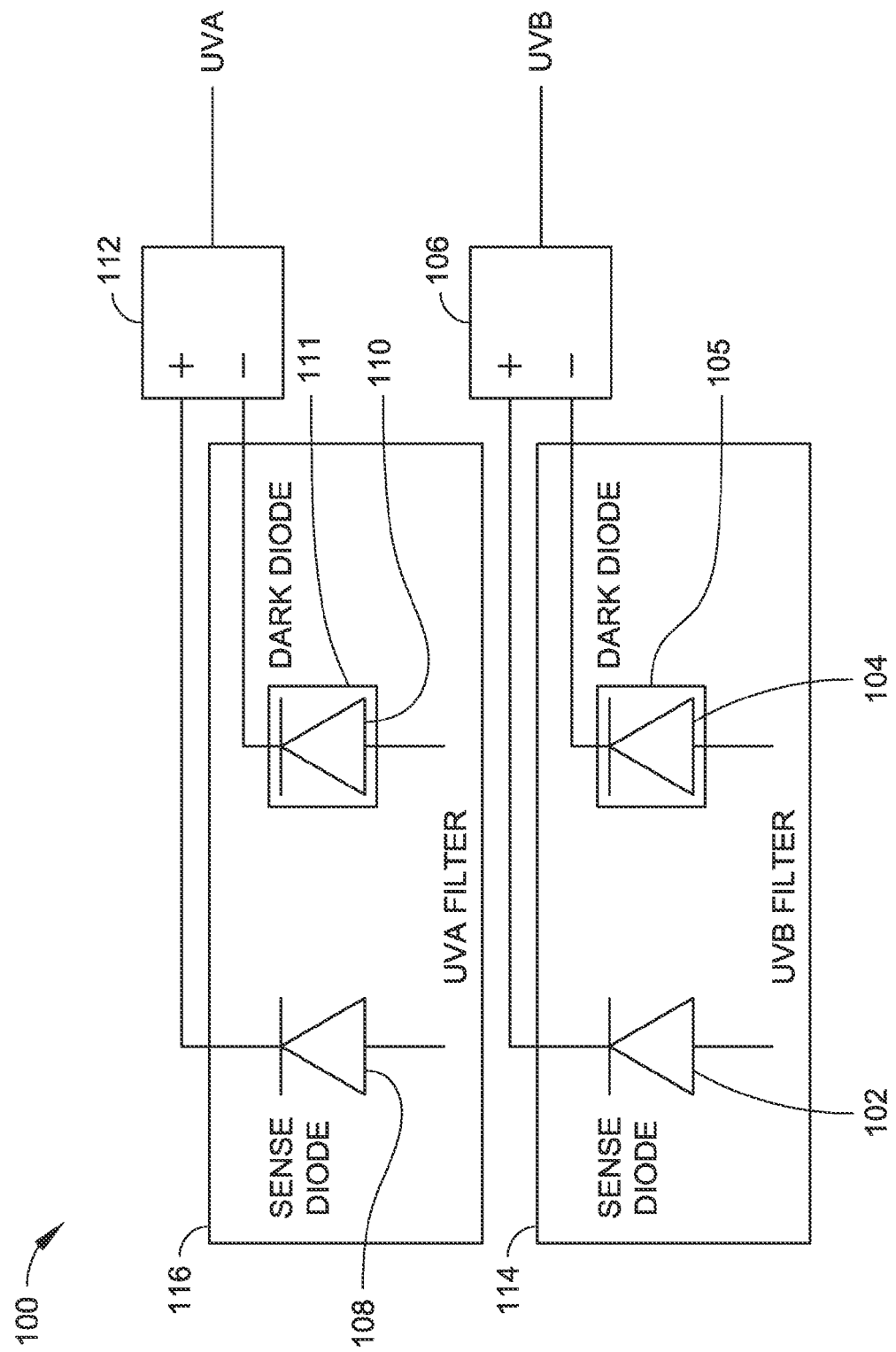
FIG. 2 is a circuit diagram of a multi-channel UV sensor in accordance with various embodiments of the present disclosure.
Figure 3:
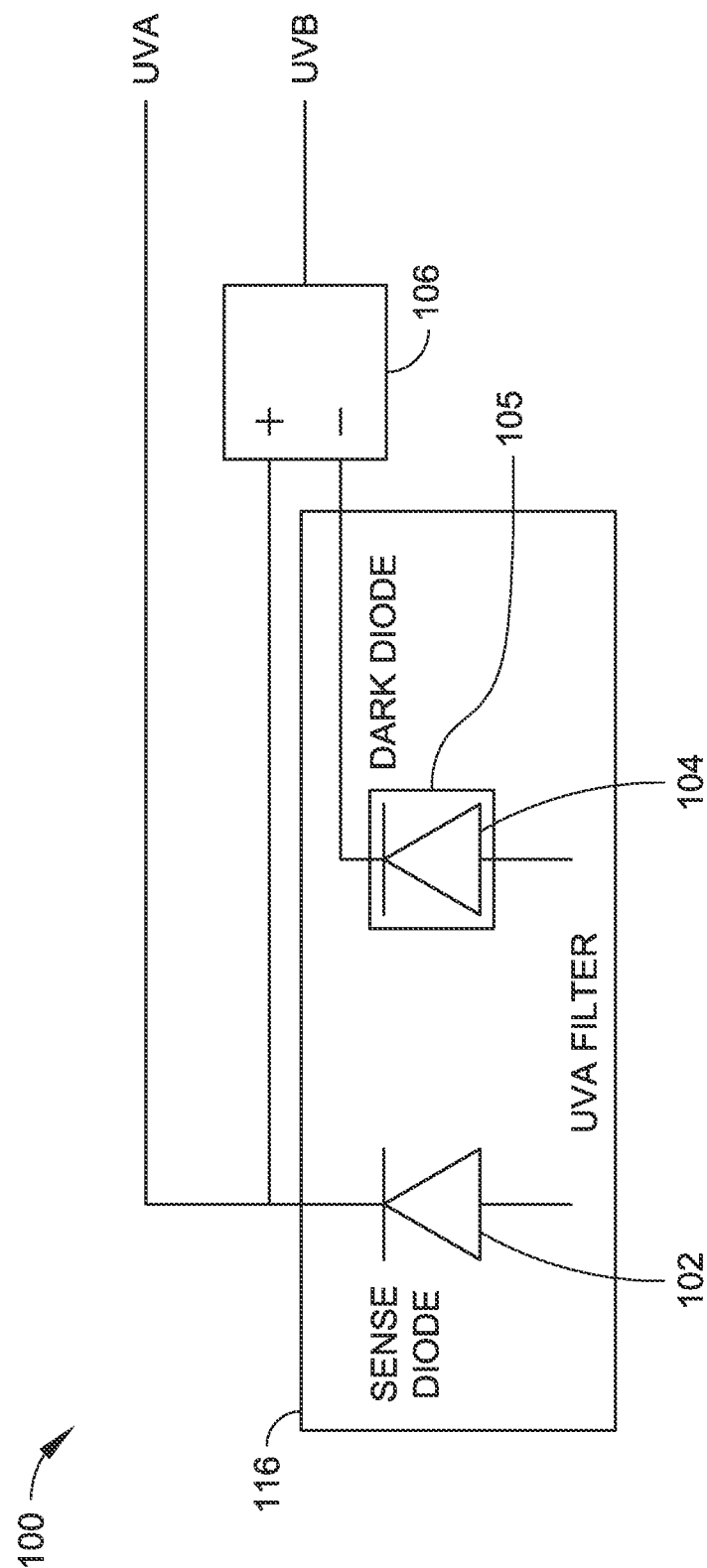
FIG. 3 is a circuit diagram of a multi-channel UV sensor in accordance with various embodiments of the present disclosure.
Figure 4:
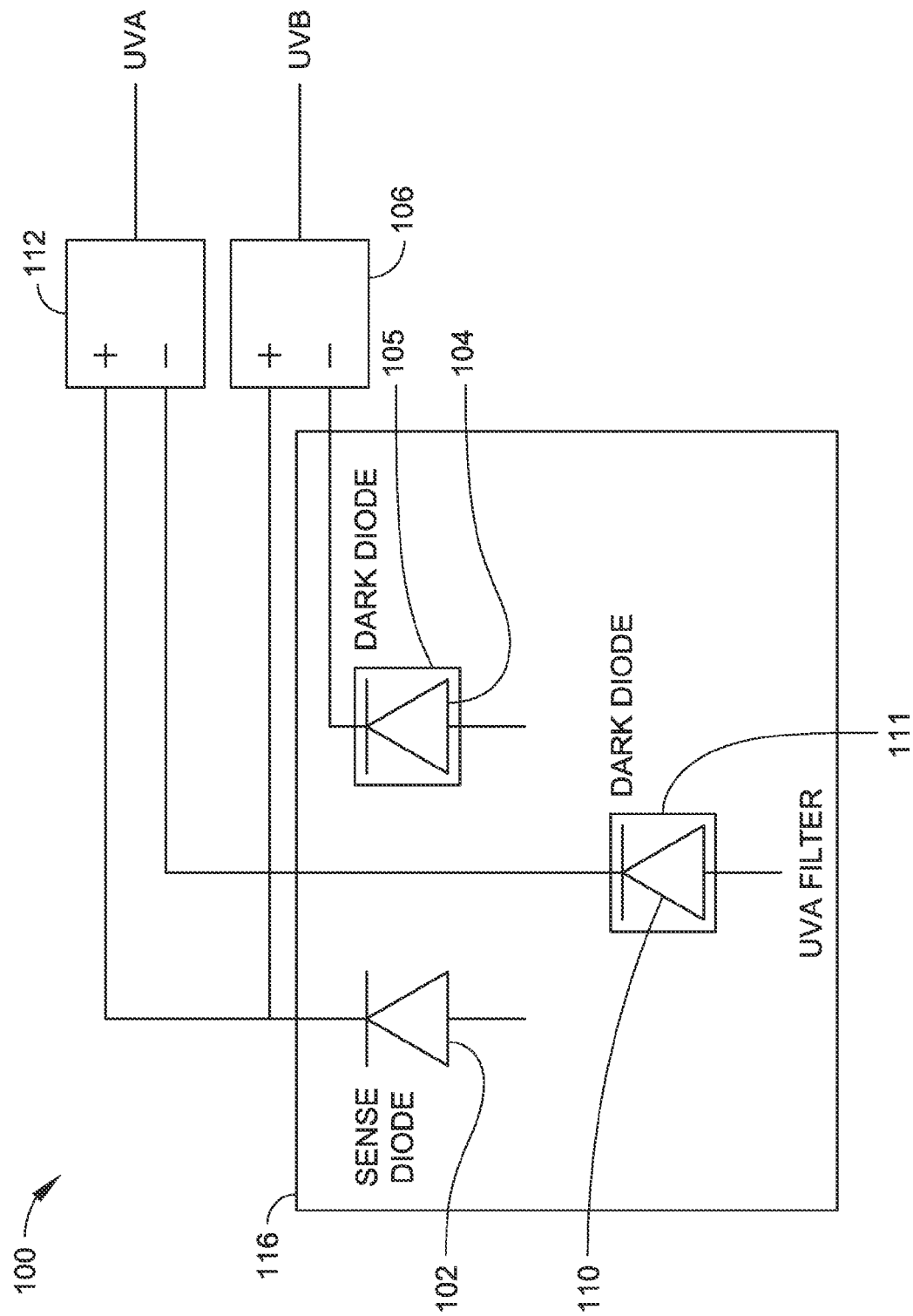
FIG. 4 is a circuit diagram of a multi-channel UV sensor in accordance with various embodiments of the present disclosure.

In some embodiments, the UV sensor 100 includes two or more sensor channels as shown in FIGS. 2 through 4. An embodiment is shown in FIG. 2, where the UV sensor 100 includes a first (UVA) channel and a second (UVB) channel. The UVB channel can be implemented in accordance with one or more of the embodiments described above (e.g., using a filter layer for dark diode subtraction). The UVA channel can also include a respective sense photodiode 108 and a respective dark photodiode 110, where the dark photodiode 110 has a metal layer 111 formed thereon for providing a reference for leakage current cancellation. The UVA channel can also include a respective subtraction circuit/logic 112 that provides a differential response resulting in a spectral response corresponding to that of the sense photodiode 108, with leakage current cancelled. Additionally, a wafer level UVA filter 116 can be applied to the sense photodiode 108 and/or the dark photodiode 110 of the UVA channel to filter/tune the channel to UVA spectrum sensitivity.

In the context of solar spectrum estimation, it has been found that UVA filtration can be implemented with a higher tolerance to manufacturing variations than UVB filtration due to the exponentially increasing intensity of the solar spectrum across UVB wavelengths compared to a relatively much lower increase in solar spectrum intensity across UVA wavelengths. Thus, the system 100 can utilize a UVA filter to target UVA spectra and rely at least partially on dark diode subtraction with a controlled dark photodiode 104 to target UVB spectra. This is different from the dark diode subtraction applied to the UVA channel because, unlike metal coverage, the filter layer over dark photodiode 104 can transmit more or less UV light based upon a controlled parameter. For example, thickness or any other spatial (e.g., surface area, density, geometry) or physical parameter (e.g., polarization) of the filter layer that affects an absorption characteristic can be controlled. In this regard, the filter layer can be operable as an absorption filter rather than simply performing a leakage current cancellation function, as performed by the metal blocking layer 111 formed over the dark photodiode 110 of the UVB channel. Further, it is noted herein that the UV sensor 100 can implement two or more sensor channels that are not necessarily limited to UVA and UVB channels. The UV sensor 100 can include any number of channels targeted to specified spectral ranges with one or more of the channel architectures discussed herein.

Embodiments of multi-channel circuit configurations are also illustrated in FIGS. 3 and 4. In some embodiments, one or more sensor components are shared between the two or more channels to further reduce the circuit complexity. For example, one sense photodiode 102 can feed both of the UVA and UVB channels. As shown in FIG. 3, the sense photodiode 102 can be filtered by a wafer level UVA filter 116 to provide a first channel output targeting the UVA spectrum. The wafer level UVA filter 116 can also partially filter the dark (e.g., nitride-covered) photodiode 104 of the UVB channel. The UVB channel output is primarily filtered, however, by dark diode subtraction (e.g., via the subtraction circuit/logic 106) of the dark photodiode 104 output spectral response from the sense photodiode 102 output spectral response, where the UV spectral response of the dark photodiode 104 (and the differential response as a result) is shifted according to at least one controlled parameter (e.g., thickness) of the filter layer 105. As shown in FIG. 4, the UVA channel can also include a respective dark photodiode 110 with a metal blocking layer 111 formed over it and respective subtraction circuitry/logic 112 to provide leakage current cancellation.

Figure 5:
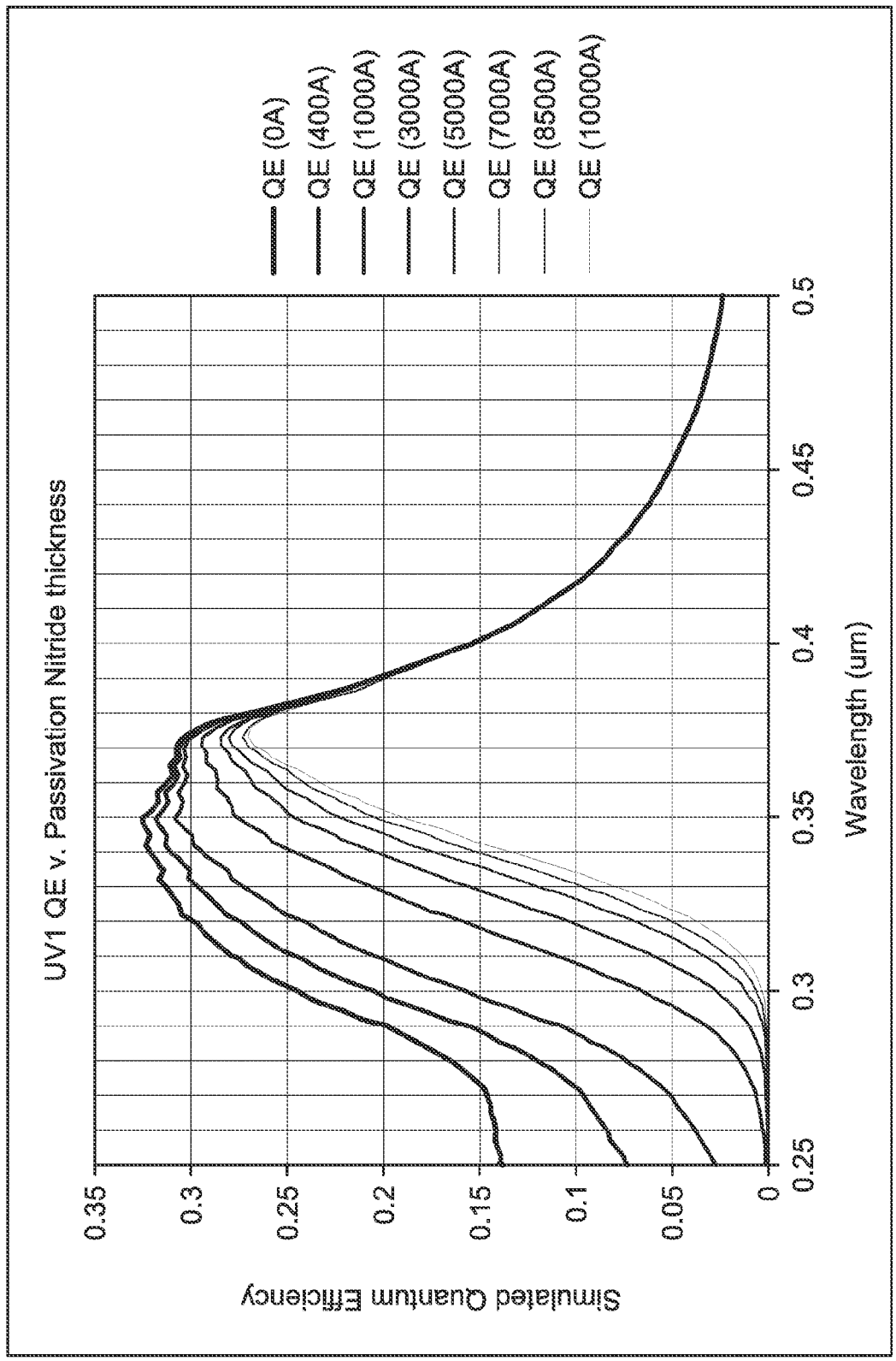
FIG. 5 is chart showing spectral response curves for photodiodes having filter layers of various thicknesses formed thereon in accordance with various embodiments of the present disclosure.
Figure 6:
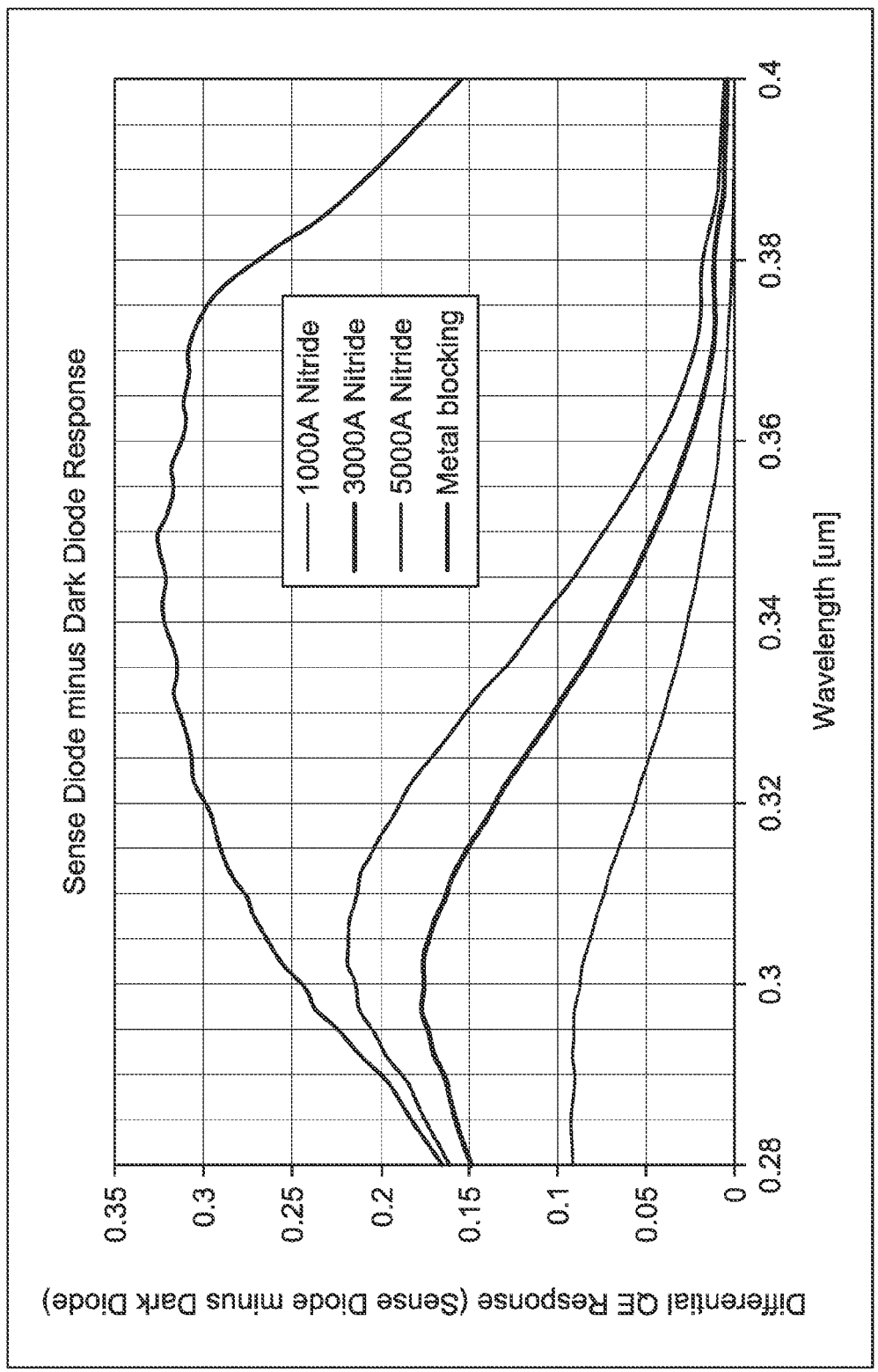
FIG. 6 is chart showing differential response curves associated with filter layers of various thicknesses and metal blocking layers in accordance with various embodiments of the present disclosure.
Figure 7:
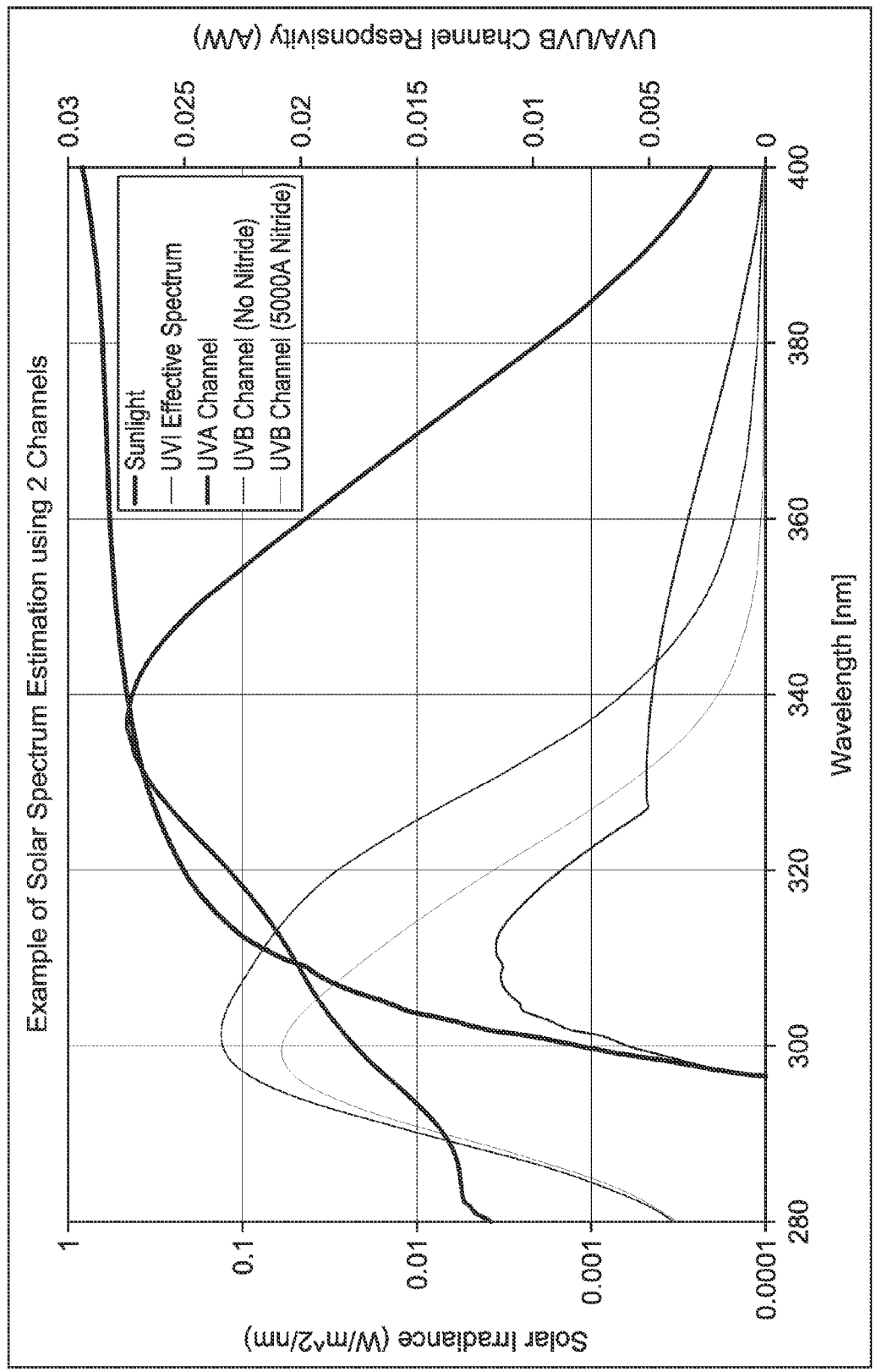
FIG. 7 is chart showing spectral response curves for various target spectrums in accordance with various embodiments of the present disclosure.
Figure 8:
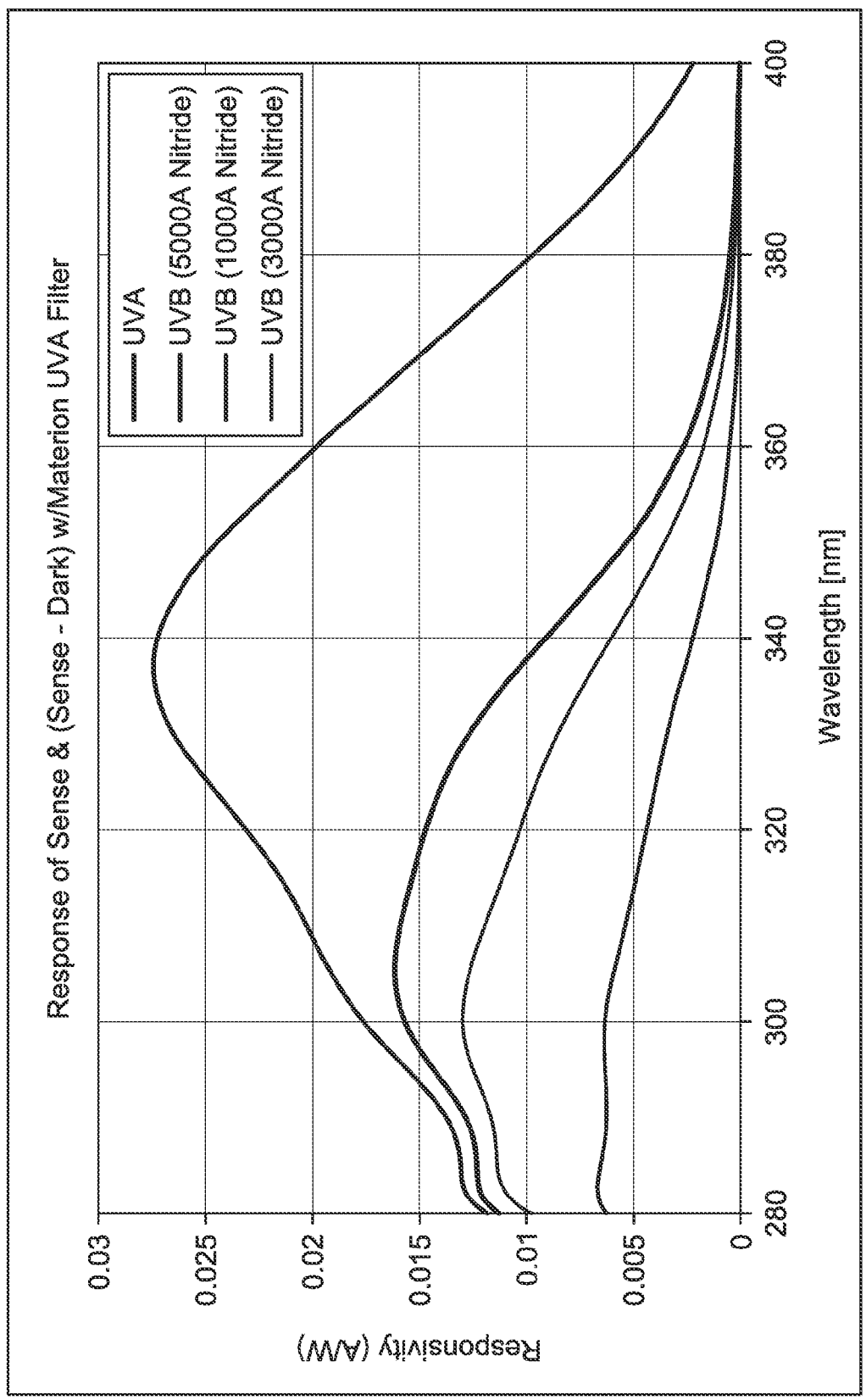
FIG. 8 is chart showing spectral response curves for photodiodes having filter layers of various thicknesses formed thereon in accordance with various embodiments of the present disclosure.

FIGS. 5 through 8 show spectral response curves illustrative of various embodiments of the system 100. For example, FIG. 5 is chart showing spectral response curves for photodiodes having filter layers (e.g., nitride layers) of various thicknesses formed thereon. FIG. 6 is a chart showing differential response curves resulting from subtraction of dark diode spectral response from sense diode spectral response. As can be seen, the resulting differential responses with nitride blocking layers provide spectral response curves focused around UVB spectra. On the other hand, it can be seen that the resulting differential response with a metal blocking layer over the dark photodiode can have peak sensitivity outside of UVB spectra. Thus, a wafer level UVB filter may be required when a metal blocking layer is used. For reasons discussed above (e.g., manufacturing errors/device tolerances), dark diode subtraction with a metal-covered dark photodiode may not work well for UVB detection. FIG. 8 also illustrates differential response curves associated with various thicknesses of the filter layer 105 for the UVB channel, where a wafer level UVA channel is applied to the sense photodiode 102 and the dark photodiode 104. FIG. 8 also shows a response curve for the UVA channel.

FIG. 7 illustrates UVA and UVB channel spectral response curves. As can be seen, a deeper and better targeted UVB response is achieved with nitride coverage. FIG. 7 also shows a solar (e.g., sunlight) spectral response curve. The solar spectrum can be derived from the UVA and UVB spectral responses by mathematical spectrum modeling techniques in conjunction with well-known Black Body radiation theory. Further, using an appropriate algorithm or mathematical model, the solar spectral response can be used to derive the UV index or any other biologically or environmentally relevant spectrum. A derived UV index response curve is also shown in FIG. 7.

The system 100 can include one or more processors in communication with the sensor channel outputs or photodiodes 102, 104, 108, and/or 110. The one or more processors can be configured to execute program instructions stored by at least one carrier medium to carry out processes including, but not limited to, collecting sensor/channel readings, digital filtering, data processing (e.g., subtraction of dark diode response from sense diode response where the subtraction circuitry/logic 106 and/or 112 is implemented by one or more software modules), and/or mathematical modeling to provide solar spectrum, UV index, or any other target spectrum. Additionally, the system 100 can be integrated into a mobile device, such as a smartphone, tablet, media player, activity tracker or other wearable device, laptop, or the like.

In some embodiments, contextual information for response modeling and/or determining correction factors may be retrieved via direct link or wireless link (e.g., IP protocol, satellite-based communication, radio-based communication, cell phone towers, and/or Bluetooth beacons). Relevant contextual information can include time of day, time of year, location, altitude, orientation, pressure, ozone mapping, or the like. For example, a location and a time associated with the detected UV spectra can be used to determine an expected solar spectrum, and a correction factor can be provided for the target (e.g. UV index) spectrum based on the expected solar spectrum.

Process deviations can occur while the photodiodes are fabricated. For example, in the case of dark photodiodes 104 that have a filter layer 105 (e.g., passivation layer) formed over them, one or more controlled parameters of the filter layer 105 can deviate from batch to batch according to process tolerances. During fabrication, however, it is not uncommon to periodically test one or more sample devices from each batch or at least one sample for a set of batches. Using ellipsometry, reflectometry or any other technique for measuring spatial or physical attributes of a sample, a controlled parameter of interest can be measured for the filter layer 105 of at least one sample device. The measured parameter can be compared with an expected (i.e., controlled) parameter of the filter layer 105 of the sample device, and the difference can be used in conjunction with known transmission properties of the filter layer to determine a correction factor for the sample device. In some embodiments, the measured parameter, difference value, and/or correction factor can be stored to memory (e.g., a non-transitory machine-readable medium) of the sample device and other devices (e.g., photodiodes) belonging to the same batch or set of batches. This data can be accessed by one or more processors of the UV sensor 100, and can be used by the one or more processes to digitally compensate for process errors of the physical device components.

It should be recognized that the various functions, operations, blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be implemented, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A multi-channel ultraviolet (UV) sensor, comprising:
   a first photodiode with a first UV spectral response;
   a second photodiode with a second UV spectral response;
   a filter layer having a graded spectral response, the filter layer being formed over the second photodiode, wherein the second UV spectral response is affected by a controlled parameter of the filter layer;
   a first subtraction circuit coupled with the first photodiode and the second photodiode, the first subtraction circuit being configured to provide a first differential response based on a difference between the first UV spectral response and the second UV spectral response;
   a third photodiode with a third UV spectral response;
   a metal layer formed over the third photodiode for leakage current cancellation; and
   a second subtraction circuit coupled with the first photodiode and the third photodiode, the second subtraction circuit being configured to provide a second differential response based on a difference between the first UV spectral response and the third UV spectral response.

2. The multi-channel UV sensor of claim 1, wherein the first differential response is associated with a target spectrum, and the controlled parameter is selected to achieve the target spectrum.

3. The multi-channel UV sensor of claim 1, further comprising a UVA filter formed over the first and second photodiodes.

4. The multi-channel UV sensor of claim 1, wherein the filter layer comprises a layer with spectrally graded material absorption.

5. The multi-channel UV sensor of claim 4, wherein the filter layer comprises a passivation layer.

6. A multi-channel ultraviolet (UV) sensor, comprising:
   a first photodiode with a first UV spectral response;
   a second photodiode with a second UV spectral response;
   a filter layer having a graded spectral response, the filter layer being formed over the second photodiode, wherein the second UV spectral response is affected by a controlled parameter of the filter layer;
   a first subtraction circuit coupled with the first photodiode and the second photodiode, the first subtraction circuit being configured to provide a first differential response based on a difference between the first UV spectral response and the second UV spectral response;
   a third photodiode with a third UV spectral response;
   a fourth photodiode with a fourth UV spectral response;
   a metal layer formed over the fourth photodiode for leakage current cancellation; and
   a second subtraction circuit coupled with the third photodiode and the fourth photodiode, the second subtraction circuit being configured to provide a second differential response based on a difference between the third UV spectral response and the fourth UV spectral response.

7. The multi-channel UV sensor of claim 6, wherein the first differential response is associated with a first target spectrum, and the controlled parameter is selected to achieve the target spectrum.

8. The multi-channel UV sensor of claim 6, further comprising:
   a UVB filter formed over the first and second photodiodes; and
   a UVA filter formed over the third and fourth photodiodes.

9. The multi-channel UV sensor of claim 6, wherein the filter layer comprises a layer with spectrally graded material absorption.

10. The multi-channel UV sensor of claim 9, wherein the second UV spectral response is affected by a thickness of the layer.

11. The multi-channel UV sensor of claim 9, wherein the filter layer comprises a passivation layer.

* * * * *